Patented May 25, 1926.

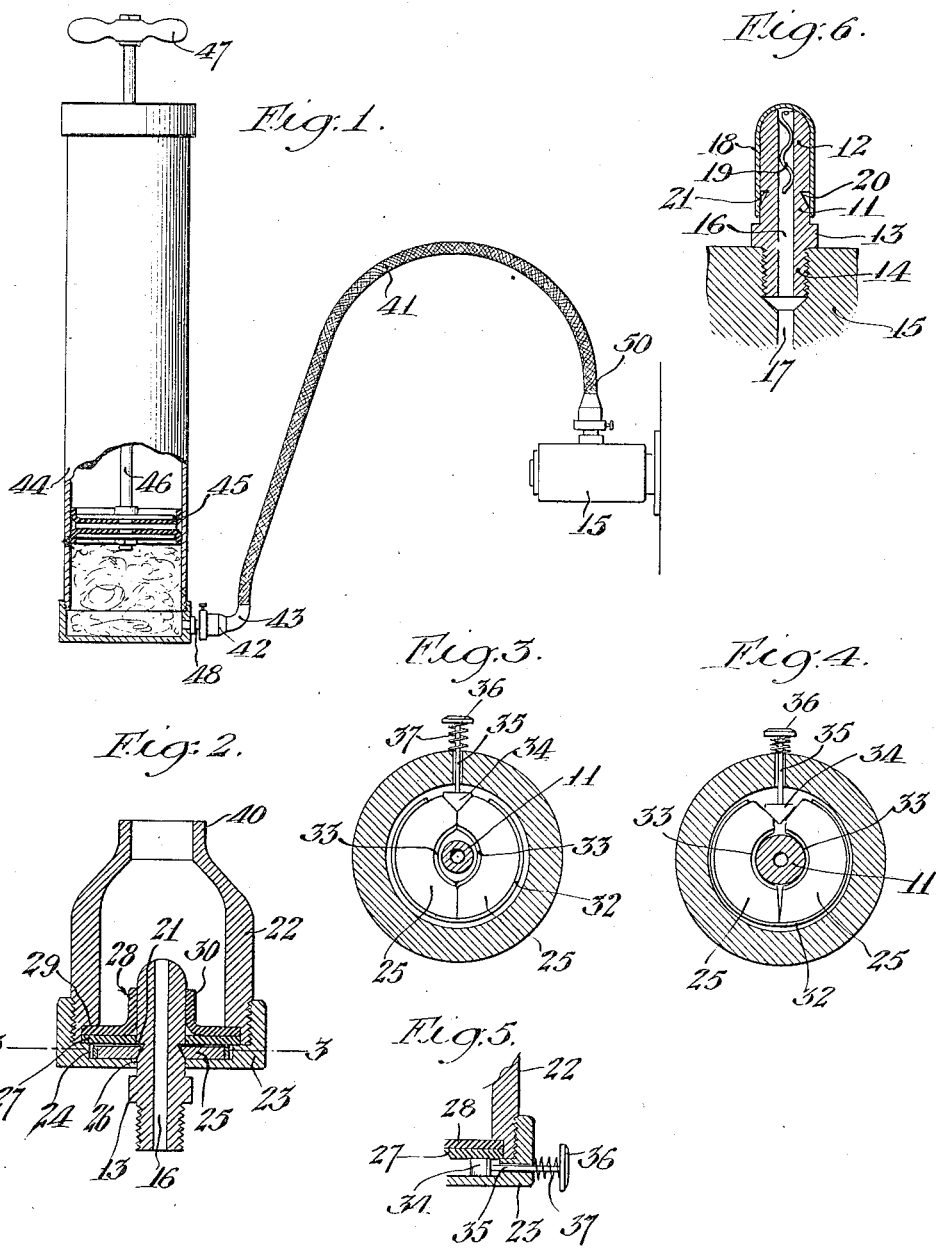

1,586,350

UNITED STATES PATENT OFFICE.

WILLIAM W. BRAMLETTE, OF BELL, CALIFORNIA.

GREASE-GUN-COUPLING DEVICE.

Application filed December 19, 1919. Serial No. 346,396.

My invention relates to the art of lubricating the moving parts of machinery, vehicles and the like, being more particularly a coupling device for connecting a grease gun to a grease cup. It is common practice to supply a lubricant known as hard grease to certain of the moving parts of automobiles, such as axles, rod connections and similar parts, by mounting a grease cup on the structure in which a supply of grease is placed. These grease cups are ordinarily threaded and are provided with a threaded cap for covering the open end of the cup. To fill grease cups of such construction considerable time is required to unscrew each cap, fill the cap with grease and then screw the cap in place on the cup, considerable difficulty being had also with starting the cap on the threads of the cup, particularly where many cups on automobiles are in what may be termed out of the way places.

The principal object of my invention is to produce a coupling for the grease gun which may be quickly and with a simple movement connected with a modified form of grease cup and as readily detached so that a great number of grease cups may be filled in an extremely short time.

Other objects and advantages will appear hereinafter from the following description and drawings.

Referring to the drawings which are for illustrative purposes only,

Fig. 1 is a side elevation, partly in section, of a device embodying a form of my invention.

Fig. 2 is an enlarged vertical sectional view of the coupling and grease cup shown in Fig. 1.

Fig. 3 is an inverted sectional plan view on line 3—3, Fig. 2.

Fig. 4 is a view similar to Fig. 3 showing the movable members in expanded or open position.

Fig. 5 is a fragmentary vertical sectional view of the casing showing a wedge device for operating the movable members, and, Fig. 6 is a vertical sectional view of a grease cup showing the cap thereon.

With my device I use a modified form of grease cup which consists of a nipple 11 having a rounded head 12, a circular flange 13 and a threaded stem 14 which is threaded into the bearing 15 or other part to be lubricated. The nipple is provided with a longitudinal passage 16 which connects with a passage 17 in the bearing. A cap 18 is provided for covering the nipple, a bent spring member 19 being secured to the cap which extends into the passage 16 frictionally engaging the walls of said passage to hold the cap in place.

The head of the nipple is provided with a circular groove 20 to form a shoulder 21 for the purpose hereinafter described. The coupling member consists of a circular casing 22, the outer end of which is closed by means of a head 23 threaded on the casing. This head 23 is recessed on the inside as indicated at 24 for containing movable gripping members or plates 25 semicircular in form. The head 23 is also provided with a central opening 26 through which the head of the grease cup may be inserted as hereinafter described. The members 25 are retained in place by means of a flat ring 27 which is placed over a packing member 28 seated against a shoulder 29 formed in one end of the casing. The packing member 28 is preferably made of leather or other suitable material and is formed with an inwardly extending circular flange 30 which receives the head of the grease cup as hereinafter more fully described. The plates 25 are elastically held together by means of a flat spring 32 which extends partly around the plates as shown in Figs. 3 and 4. The plates 25 are each provided with a cam face 33 so arranged with respect to each other that they are simultaneously engaged by means of a wedge 34 mounted on the end of a pin 35 which operates through a suitable opening in one side of the head 23. The pin is provided with a disk or finger piece 36 by means of which the pin may be depressed, a coiled spring 37 being arranged on the pin under the disk 36 for elastically holding the wedge in inoperative position.

One end of the casing 22 terminates in a hollow stem 40 to which is attached in any suitable manner a flexible nose 41, the other end of which is similarly attached to a coupling 42 like the one above described in all respects except that the hollow stem to which the hose is attached is formed with an elbow 43.

44 designates a grease gun which may be of any common form as to its general construction, 45 designating a plunger, 46 a rod upon which the plunger is mounted, and 47 a handle for operating the same. The outlet of the gun is provided with a grease cup 48 of the same construction above described.

The device is operated in the following manner:

The cap 18 is removed from the cup to be filled with grease and the coupling attached by pushing the coupling down upon the grease cup which operation consists in the nipple entering the opening in the head 23 and extending into the packing member 28. When in this position the plates 25, having been pushed apart by the entering nipple, spring into the groove 20 and engage behind the shoulder 21 where they remain until the cup is filled when the pin 35 is depressed causing the wedge 34 to separate the plates 25 thereby releasing the nipple and allowing the coupling to be removed and the cap 18 placed on the cup.

The hose 41 is attached to the grease gun by placing the coupling 42 on the nipple 48 on the grease gun after which the coupling on the other end of the hose designated at 50 is attached to the cup 11 as shown in Fig. 1, in which figure the cup is shown on a bearing 15.

It is understood that after the coupling is attached to the grease cup that a slight downward movement of the plunger 45 forces the grease through the hose 41 and coupling into the grease cup and that the packing 28 prevents the grease from leaking past the nipple at the same time the members 25 prevent the coupling from backing off the nipple which would otherwise occur due to the pressure in the coupling.

It will be further understood that the filling of a grease cup with a device such as above described takes but a very short time and that a single person may take care of filling the grease cups on a great many motors in a much shorter time than can be done by the usual and common methods.

What I claim is:—

1. The combination with a grease cup having a shouldered portion, a flexible hose, and a swivel connection between said hose and grease cup consisting of a casing on the end of said hose provided with an opening arranged to receive said cup, floating members mounted in said casing arranged to engage the shouldered portion of the grease cup, a spring fitting over said members, a wedge arranged to enter between said members to spread said members apart, a retaining ring for said members, and a packing ring secured in said casing over said members.

2. The combination of a coupling having a shouldered member and a receiving member and a swivel connection between said shouldered member and said receiving member including an open end on said receiving member adapted to receive said shouldered member, floating semi-circular members mounted in said receiving member arranged to engage the shoulder on said shouldered member, a spring fitting over said floating members, a wedge arranged to enter between said floating members to spread said floating members apart, a retaining ring for said floating members, and a packing ring secured in said receiving member.

In testimony whereof, I have hereunto set my hand at Los Angeles, California, this 9th day of December, 1919.

WILLIAM W. BRAMLETTE.